No. 624,175. Patented May 2, 1899.
J. W. CHAPMAN.
JOINT FOR SHEARS.
(Application filed Feb. 8, 1899.)
(No Model.)

Witnesses,
W. B. Skinkle.
J. H. Van Derveer.

Inventor,
James W. Chapman
by Wm A. Skinkle
Attorney.

UNITED STATES PATENT OFFICE.

JAMES W. CHAPMAN, OF ELYRIA, OHIO.

JOINT FOR SHEARS.

SPECIFICATION forming part of Letters Patent No. 624,175, dated May 2, 1899.

Application filed February 8, 1899. Serial No. 704,889. (No model.)

*To all whom it may concern:*

Be it known that I, JAMES W. CHAPMAN, of Elyria, in the county of Lorain and State of Ohio, have invented new and useful Improvements in Joints for Shears or other Similar Instruments, of which the following is a specification, that will enable those skilled in the art to which my invention pertains to make and use the same.

My invention relates particularly to shear-joints. Its objects are to provide means whereby the pivoted shear-blades are pressed closely together in proper cutting relation throughout their lengths and whereby the pressure of the blades upon each other may be regulated to the greatest nicety and whereby the blades and the pivot upon which they are mounted are independent of each other, so that either blade may be rocked about the pivot without turning the pivot or the other blade and the pivot may be turned independently of both blades, and whereby any wear of the pivot or blades may be taken up and positively compensated for in every direction by conical bearings, which constitute the sole support for the blades.

It consists of a shear-joint composed of a shank upon which are two opposed conical bearings, which take into corresponding sockets on the outer sides of the blades and are adjustable toward or away from each other, the blades resting solely upon the conical bearings and not touching or bearing upon any other portion of the pivot, the conical bearings when adjusted to proper position being locked upon the shank and non-rotatable thereon.

The accompanying drawings show my invention in the best forms now known to me; but certain changes in the details and dispositions of the parts thereof within the skill of a good mechanic might be made without departing from the spirit of my invention, as set forth in the claims at the end of this specification.

Figure 1:
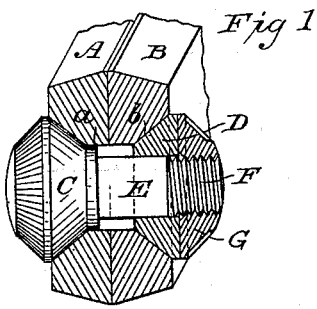
Figure 2:
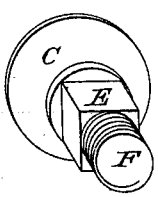
Figure 3:
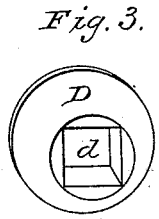
Figure 5:
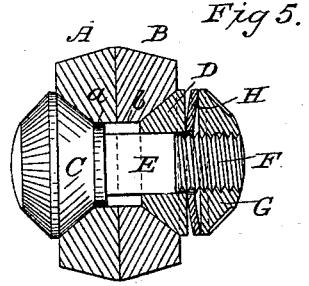
Figure 4:
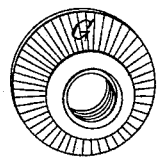
Figure 7:
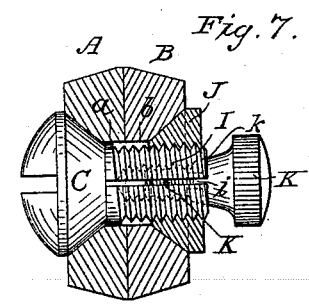
Figure 8:
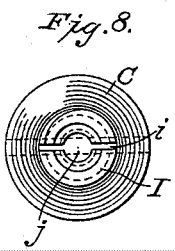
Figure 9:
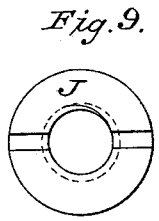
Figure 10:
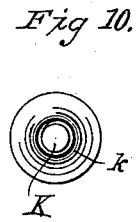

Figure 1 of the drawings is a perspective sectional elevation of parts of shear-blades united by the pivot-joint of my invention in its preferred form. Fig. 2 is a perspective view of one of the cone-bearings made integral with its squared shank and its screw-threaded extension upon which the other or loose cone-bearing, shown by Fig. 3, and the adjusting thumb-nut, shown by Fig. 4, are mounted. Fig. 5 shows a construction similar to Fig. 1 with the addition of a spring-washer, shown by Fig. 6, located between the loose cone and the thumb-nut. Fig. 7 shows a modification of the pivot-joint, and Figs. 8, 9, and 10 illustrate details thereof.

The shear-blades A and B are of any usual or desired shapes, with apertures $a$ and $b$ formed through them, the apertures being countersunk on the outer sides of the blades to form cone-shaped seats for the conical pivot-bearings C and D. One of these cones, C, is preferably made integral with the pivot-shank E, which is squared in cross-section and is provided with a screw-threaded extension F. The loose cone D has a square aperture $d$ formed through it to fit and slide upon the square portion of the shank upon which it is mounted in opposition to the other cone. The thumb-nut G fits upon the screw-threaded end of the shank and serves to force the loose cone toward the other, so that when adjusted to position the shear-blades are supported entirely by the two cones and do not come into contact with any other portion of the pivot device. The squared shank prevents the loose cone from turning independently upon it, and as the thumb-nut rests against the back of the loose cone it cannot be turned by any motion of the shear-blades. It will thus be seen that either shear-blade or the pivot may be turned without necessarily turning either of the other two members. By the use of cone-bearings in both shear-blades and the independently-rotatable pivot I can not only secure greater uniformity of wear upon the pivot-bearing surfaces, but also a more exact adjustment of the parts to compensate for wear, the two cones taking up wear of both blades in all directions, as could not be done where one blade only had a conical or partly conical bearing and the other swings upon a straight cylindrical portion of the pivot. I regard this as a very important advantage gained by my invention.

Figure 6:
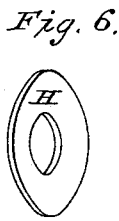

The spring-washer H, Figs. 5 and 6, introduced between the adjusting-nut and the back of the loose cone D will yield and compensate for any irregularities in the shear-blades and make them work more smoothly than would otherwise be the case.

In Figs. 7, 8, 9, and 10 I show a modification of the construction of the pivot in which the shank I is cylindrical and screw-threaded for the reception of the movable cone J, which is tapped to fit upon the threads. The shank is also cross-cut or split along its length, as shown at $i$, so as to be elastic or yielding sidewise at its end. A central hole or bore $j$ is drilled into the end of the shank and is tapped for the reception of a locking-screw K, having a tapering portion $k$ near its head, which when it enters the bore at the end of the shank tends to wedge or force apart the two sides of the bifurcated shank of the pivot and make them bind so tightly against the interior of the loose or movable cone J that the latter is locked against accidental rotation. In adjusting the bearing the screw K is turned back or out far enough to release the pressure on the split shank. The loose cone is then turned forward or back to any desired position and again locked against rotation on the shank by the screw K.

Having thus described my invention, what I claim, and desire to secure by Letters Patent, is—

1. In a shears or similar instrument the combination of the shear-blades with pivot-apertures countersunk or cone-shaped on their outer sides, a pivot-shank having opposed conical bearings which take into the corresponding apertures in the blades and are adjustable toward or away from each other with means for locking them in position and against independent rotation on the pivot-shank.

2. In a shears or similar instrument the combination of shear-blades with pivot-apertures countersunk or cone-shaped on their outer sides, a pivot-shank having a conical head at one end and an opposed loose conical bearing adjustable longitudinally on the shank with means for holding it in position and against rotation on the shank.

3. In a shears or similar instrument the combination of shear-blades with pivot-apertures countersunk or cone-shaped on their outer sides, a pivot having a conical head and a polygonal shank with screw-threaded end, a loose conical bearing opposed to the conical head and having a polygonal aperture to fit upon the shank with an adjusting-nut on the screw-threaded end of the shank and bearing against the loose cone.

In testimony whereof I affix my signature, in the presence of two witnesses, at Elyria, Ohio, January 25, 1899.

JAMES W. CHAPMAN.

Witnesses:
 L. B. FAUVER,
 F. O. WILFORD.